United States Patent [19]
Lebby et al.

[11] Patent Number: 5,539,200
[45] Date of Patent: Jul. 23, 1996

[54] INTEGRATED OPTOELECTRONIC SUBSTRATE

[75] Inventors: Michael S. Lebby, Apache Junction; Thomas H. Blair, Gilbert, both of Ariz.

[73] Assignee: Motorola, Schaumburg, Ill.

[21] Appl. No.: 334,175

[22] Filed: Nov. 3, 1994

[51] Int. Cl.⁶ ................................. G02B 6/42
[52] U.S. Cl. .............. 250/227.11; 250/215; 250/216; 385/49; 385/88
[58] Field of Search ............................ 250/227.11, 215, 250/216; 385/49, 88, 89, 14, 132; 359/163, 162

[56] References Cited

U.S. PATENT DOCUMENTS

| | | | |
|---|---|---|---|
| 4,373,778 | 2/1983 | Adham | 250/227.11 |
| 5,212,754 | 5/1993 | Basavanhally et al. | 385/88 |
| 5,276,754 | 1/1994 | Blair et al. | 385/89 |
| 5,359,686 | 10/1994 | Galloway et al. | 385/49 |
| 5,367,593 | 11/1994 | Lebby et al. | 385/49 |
| 5,416,872 | 5/1995 | Sizer, II et al. | 385/89 |
| 5,436,996 | 7/1995 | Tabasky et al. | 385/89 |

*Primary Examiner*—Stephone Allen
*Attorney, Agent, or Firm*—Gary F. Witting; Eugene A. Parsons

[57] ABSTRACT

An integrated optoelectronic substrate is provided. A molded optical substrate having a surface, a core region having a first optical surface, and a cladding region is formed with the core region being at least partially surrounded by the cladding region. An interconnect board having a first surface and a second surface is disposed on the molded optical substrate, thereby operably coupling the molded optical substrate to the interconnect board.

5 Claims, 1 Drawing Sheet

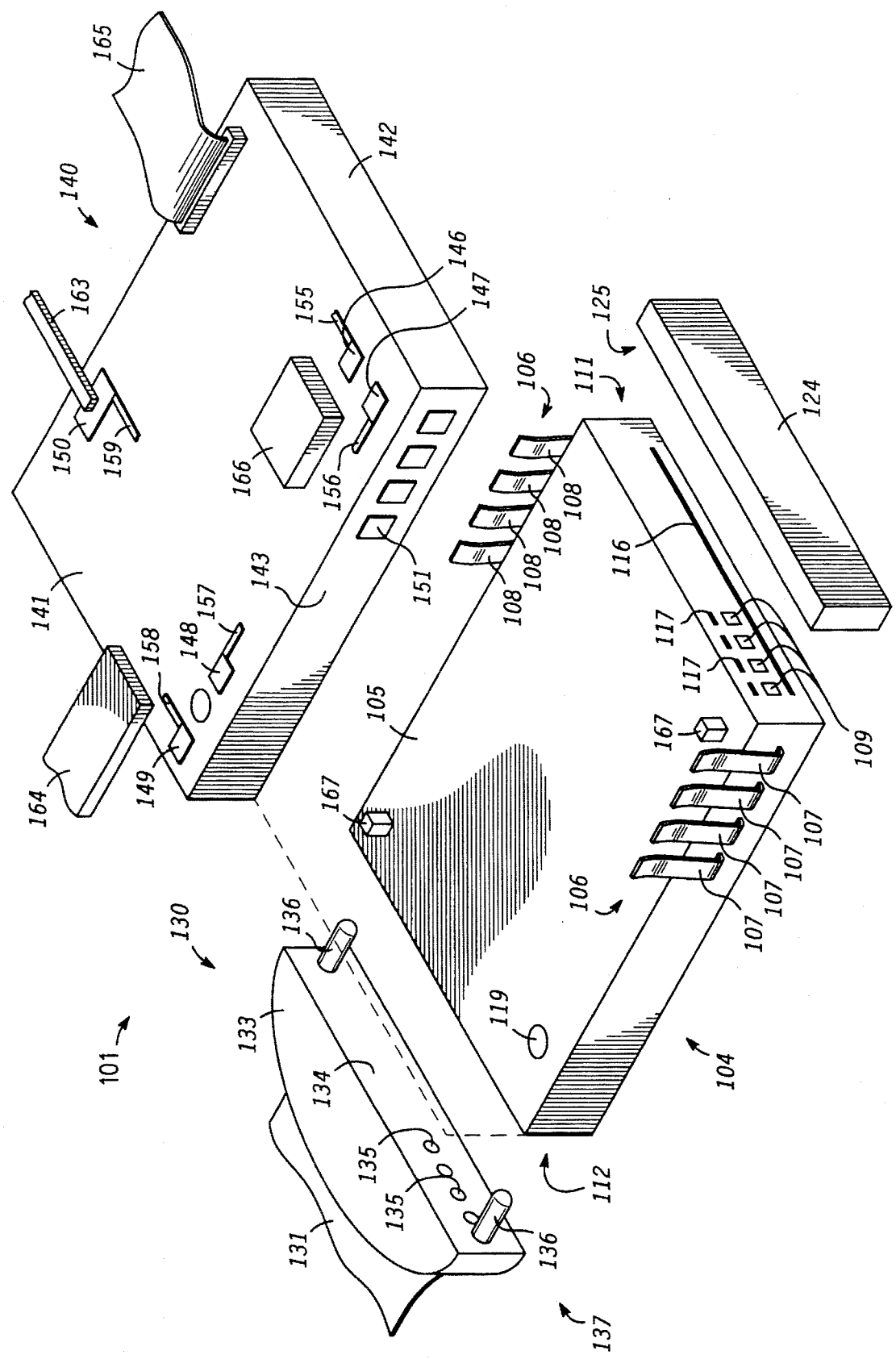

1

INTEGRATED OPTOELECTRONIC SUBSTRATE

FIELD OF THE INVENTION

This invention relates, in general, to optics and, in particular, to integration of optoelectronic elements.

BACKGROUND OF THE DISCLOSURE

At present, interconnection between optical components and standard electronic components is a difficult task which is expensive. Generally, the interconnection or integration of optical components and standard electrical components is achieved manually or semiautomatically, thereby making the integration complex, inefficient, and not suitable for high volume manufacturing. Since the integration of optical components and electrical components is not suitable for high volume manufacturing, manufacture of systems and products that would utilize advantages of both optics and electronics synergistically are generally not manufactured.

Conventionally, interconnection between optical components and standard electronics is achieved by carefully aligning a working portion of a photonic device to an optically conductive means and subsequently affixing the working portion of the photonic device to the conductive means, thereby optically coupling the conductive means to the photonic device. The photonic device is then electrically coupled to standard electrical components; however, as with the coupling of the working portion of the photonic device to the conducting means, the electrical coupling is achieved manually, thereby providing several problems, such as being extremely labor intensive, costly, inaccuracy of alignment. Thus, conventional interconnection methods and structures for optical and standard electronic components are not suitable for high volume manufacturing. Further, since conventional methods and structures are not suitable for high volume manufacturing, products capable of using the advantages of both optical components and electrical components are not manufactured. Thus, products utilizing the synergistic advantages of both optics and electronics are not realized.

At present, with the difficulty of integrating optical and electronic components, integration of optical and electronic components that are at a substrate or board level is also a difficult task.

It can be readily seen that conventional methods and structures for integrating photonic and electrical components have severe limitations which prevents realization of advantages of both photonic and electrical components. Also it is evident that the conventional methods and structures are not only complex and expensive, but also not effective for high volume manufacturing. Therefore, a method and structure for facilitating the integration of photonic devices and standard electrical components, as well as integration at a board or substrate level would be highly desirable.

BRIEF DESCRIPTION OF THE DRAWINGS

In the sole FIGURE, an integrated optoelectronic module is shown.

DETAILED DESCRIPTION OF THE DRAWINGS

In the FIGURE, an enlarged simplified perspective view of an integrated optoelectronic module 101 is shown. Integrated optoelectronic module 101 having several components, such as a molded optical substrate 104, a photonic device 124, an optical connector 130, and an interconnect board or an interconnect substrate 140 is illustrated. It should be understood that integrated optoelectronic module 101 shown in the FIGURE is greatly simplified so as to more clearly illustrate the present invention.

Molded optical substrate 104 includes a surface 105, a plurality of electrical members 106, e.g., electrical members 107 and 108, a plurality of core regions 109, a cladding region 110, ends 111 and 112, surface 113, conductive portions 116 and 117, and optical port 119 is shown. Photonic device 124 is shown to include a working portion 125 that is exploded away from molded optical substrate 104. Optical connector 130 is shown to include a optical cable 131, a body 133 having a surface 134, optical surfaces 135, and an alignment guide 137, e.g., alignment pins 136. Interconnect board 140 is shown to include surfaces 141, 142, and 143, bonding pads 146, 147, 149, and 150, electrical traces 155, 156, 157, 158, and 159, a conductive member 163, electrical contacts 148, e.g., electrical contact 151, and electrical cable 165.

In the present invention, molded optical substrate 104 is made by any suitable molding method or technique, such as injection molding, transfer molding, or the like. Additionally, any suitable material or materials, such as a plastic material, an epoxy material, a polyimide material, or the like are used. Molding of the molded optical substrate 104 provides the plurality of core regions 109 surrounded by cladding region 110. Typically, the plurality of core regions 109 and cladding region 110 are made of a hard optically transparent polymer, with the plurality of core regions 109 having a higher refractive index than does cladding region 110, thus allowing for efficient light guiding and transmission through the plurality of core regions 109. For example, with the plurality of core regions 109 and cladding region 110 being made of a molding material having a refractive index ranging from 1.3 to 1.7, the refractive index of the plurality of core regions 109 is 0.01 higher than cladding region 110, thereby enabling efficient guiding of light or optical signals through the plurality of core regions 109.

Further, molded optical substrate 104 is molded to any suitable size and shape; however, so as to better integrated molded optical substrate 104 with interconnect substrate 140, both molded optical substrate 104 and interconnect substrate 140 are similar in size and shape, thereby facilitating coupling of the plurality of conductive members 106 with the plurality of electrical contacts 148.

Also, molded optical substrate 104 is formed so that ends 111 and 112 expose optical surfaces 110 or portions of the plurality of core regions 109, thereby enabling the exposed portion or optical surfaces 110 of the plurality of core regions 109 to be optically coupled with other optical structures. In addition, it should be understood that the plurality of core region 109 can be formed into a variety of different configurations, such as being curved, having an end with a reflective surface, splitting, e.g., bifurcated, or the like in molded optical substrate 104. Thus, the plurality of core regions 109 can perform a variety of optical functions.

As illustrated in the FIGURE, optical surfaces 110 of the plurality core regions are exposed on surface 113 of end 111, thereby enabling optical coupling of the plurality of core regions 109 with working portion 125 of photonic device 124. Additionally, it should be understood that end 112 also has a surface that exposes optical surfaces of the plurality of core regions 109 that enables optical coupling of optical surfaces 135 of optical connector 130 with the plurality of core regions 109.

Optical port 119 illustrates an optical communication port that optically couples molded optical substrate 104 to interconnect board 140. More specifically, optical port 119 is made by molding a reflective surface in molded optical substrate 104, thereby reflecting light or optical signals either to or from molded optical substrate 104 or interconnect board 140, respectively. The reflective surface is made by any suitable method, such as providing a metal reflective surface, providing a change in refractive index, or the like. Generally, the reflective surface is positioned at an angle ranging from 20 to 80 degrees, with a preferred angle of 45 degrees. For example, with optical signals traveling in one of the plurality of core regions 109 and striking the reflective surface, the optical signals are reflected through optical port and into photonic device 164. In yet another example, with the optical signals being generated from photonic device 164, the optical signals pass through interconnect substrate 140 and through optical port 119. The optical signals are then reflected off of the reflective surface and into one of the core regions of the plurality of core regions 109.

Thus, optical signals can enter and leave molded optical substrate by a variety of paths, thereby enhancing flexibility and speed of integrated optoelectronic module 101.

The plurality of electrical members is made of any suitable electrically conductive material, such as copper, aluminum, metal alloys, and the like. However, in a preferred embodiment of the present invention, the plurality of electrical members is made of lead frame members that are embedded in molded optical substrate during the molding process of molded optic substrate. Upon completion of the molding process, the lead frame members are trimmed and formed to make the plurality of electrical members 106, thereby providing electrical coupling between molded optical substrate 104 and interconnect substrate 140. More specifically, the plurality of electrical members 106 engage electrical contacts 148, thereby electrically coupling molded optical substrate 104 and interconnect substrate 140. Further, the lead frame members embedded in molded optical substrate extend from the plurality of electrical members 106 to surface 113 forming conductive portions 116 and 117. Generally, conductive portion 116 is a ground strap with conductive portions 117 being individually identified with one of the plurality of electrical members 106, thereby enabling electrical signals to pass through the lead frame members.

Photonic device 124 is made of any suitable optoelectronic device, such as a phototransmitter, a photoreceiver, or a bifunctional photonic device, i.e., an optoelectronic device that is both a phototransmitter and a photoreceiver. When the optoelectronic device is a phototransmitter, the optoelectronic device is any suitable phototransmitting device, such as a laser, e.g., vertical cavity surface emitting layer (VCSEL), a light emitting diode (LED), or the like. Alternatively, when optoelectronic device 124 is an photoreceiver, the optoelectronic device is any suitable photoreceiving device, such as a photodetector, a photodiode, e.g., p-i-n photodiode, or the like. In addition, depending upon a specific application, photonic device 124 is configured either as an array having photoreceiver, phototransmitter, a combination of both photoreceivers and phototransmitters.

Generally, photonic device 124 is assembled to molded optical substrate 104 by any suitable well-known method in the art, such as manually, semiautomatically, or automatically. However, in a preferred embodiment of the present invention, assembly of photonic device 124 to molded optical substrate 104 is achieved by an automated system, such as a robot arm or the like.

Optical connector 130 is made with optical cable 131 incorporated into body 133. By incorporating optical cable 131 into body 133, individual optical fibers in optical cable 131 are positionally fixed in relation to alignment pins 136, thereby providing optical surfaces 135 of the individual optical fibers on surface 134.

Alignment guide 137 is made in any suitable configuration, such as alignment pins 136, alignment keys and ways, and the like. By way of example, with alignment guide 137 being alignment pins 136 and with alignment pins 136 have reciprocal openings in end 112 of molded optical substrate, insertion of alignment pins 136 into the reciprocal openings aligns optical surfaces 135 to the plurality of core regions 109 at end 112 of molded optical substrate 104. Thus, allowing a light signal to be transferred from molded optical substrate 104 to optical connector 130 in either direction. In a preferred embodiment of the present invention, optical connector 130 is detachably engaged with end 112 of molded optical substrate 104, thereby bringing optical surfaces 135 and the plurality of core regions 109 together so as to operably connect the plurality of core regions 109 and optical surfaces 135.

Interconnect substrate 140 is made of any suitable interconnect substrate, such as a printed circuit board (PCB), an FR4 board, silicon interconnect substrate, a ceramic interconnection substrate, or the like. Typically interconnection substrate 140 provides a plurality of electrical traces, represented by electrical traces 155–159, on interconnect substrate 140. Electrical traces 155–159 electrically couple a variety of components, such as conductive member 163, photonic device 164, electric cable 165, integrated circuit 166. It should be understood that the variety of components varies in specific applications, thus discrete devices, such as capacitors, transistors, resistors, and the like can also be electrically coupled through electrical traces 155–159. Additionally, interconnect substrate 140 can electrically communicate though conductive member 163 or electrical cable 165. Thus, interconnect substrate 140 is integratable with other electronic devices and systems, such as boards, computers, and the like.

Interconnection between molded optical substrate 104 and interconnection substrate 140 is accomplished either optically through optical port 119 to photonic device 164 or electrically through the plurality of electrical members 106 to electrical contacts 148, thereby integrating molded optical substrate 104 and interconnection substrate 140. By integrating optical substrate 104 and interconnection substrate 140, advantages of both optics and electronics are utilized. For example, since molded optical substrate 104 and interconnect substrate 140 molded optical substrate 104 transports more information at greater speeds than an electronic system alone. Generally, interconnect substrate 140 is positioned on molded optical substrate 104 and aligned by any suitable method, such as machine vision, physical alignment, e.g., tabs 167, or the like.

Further, attachment of interconnect substrate 140 to molded optical substrate 104 is either permanent or detachably engaged depending on the specific application. In the case of the permanent attachment, molded optical substrate is affixed to interconnect substrate with any suitable optical adhesive, such as an epoxy, a polyimide, a plastic, or the like. If optical port 119 is used, then selection of the optical adhesive is dependent upon both adhesive qualities and the refractive index if optical port 119 is to be used. Generally, the refractive index of the optical adhesive ranges from 1.3 to 1.7; however, by selecting a refractive index that is similar to the plurality of core regions 109 allows for an optimal transference of light from optical port 119 to photonic device 164.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An integrated optoelectronic module comprising:

a molded optical substrate having a major surface with a width and a length, a first end surface and a second end surface, the substrate including a core region having a first optical surface and a second optical surface and a cladding region, the first end surface of the molded optical substrate exposing a portion of the first optical surface of the core region, the second end surface of the molded optical substrate exposing a portion of the second optical surface of the core region, and the core region being at least partially surrounded by the cladding region;

a conductive member having a first electrical contact and a second electrical contact, a portion of the conductive member being embedded in the cladding region of the molded optical substrate with the first electrical contact being exposed at the first end surface of the molded optical substrate and with the second electrical contact of the conductive member being exposed;

a light emitting and/or detecting device with a portion for emitting or detecting optical signals, the portion for emitting or detecting optical signals of the light emitting and/or detecting device being optically coupled to the first optical surface of the end surface of the molded optical substrate and the light emitting and/or detecting device being electrically coupled to the first electrical contact of the conductive member; and an interconnect board having a first major surface with a width and length approximately equal to the width and length of the major surface of the molded optical substrate and a second surface, the first major surface of the interconnect board having a plurality of electrical traces and a plurality of electrical bonding pads coupled to the electrical traces, the interconnect board being disposed on the major surface of the molded optical substrate with the first major surface of the interconnect board overlying and substantially coextensive with the major surface of the molded optical substrate, and the plurality of electrical traces being operably coupled to the second electrical contact of the conductive member.

2. An integrated optoelectronic module as claimed in claim 1 wherein the photonic device is a phototransmitter.

3. An integrated optoelectronic module as claimed in claim 2 wherein the phototransmitter is a laser.

4. An integrated optoelectronic module as claimed in claim 1 wherein he photonic device is a photoreceiver.

5. An integrated optoelectronic module as claimed in claim 4 wherein the photoreceiver is a photodiode.

* * * * *

UNITED STATES PATENT AND TRADEMARK OFFICE
CERTIFICATE OF CORRECTION

PATENT NO. : 5,539,200
DATED : July 23, 1996
INVENTOR(S) : Michael S. Lebby
Thomas H. Blair It is certified that error appears in the above-indentified patent and that said Letters Patent is hereby corrected as shown below:

Claim 4, column 6, line 25,
Delete "he" and insert --the-- therefor.

Signed and Sealed this

Fourteenth Day of October, 1997

Attest:

BRUCE LEHMAN

Attesting Officer   Commissioner of Patents and Trademarks